United States Patent [19]

Clark et al.

[11] 4,034,147
[45] July 5, 1977

[54] CONTAMINATION CONTROL DEVICE

[75] Inventors: Robert M. Clark, Ligonier; John C. Cronin, Greensburg, both of Pa.

[73] Assignee: Gould Inc., Rolling Meadows, Ill.

[22] Filed: Feb. 25, 1976

[21] Appl. No.: 661,122

[52] U.S. Cl. .......................... 174/14 R; 174/16 B; 174/99 B
[51] Int. Cl.² ......................................... H01B 9/04
[58] Field of Search ................ 174/16 B, 14 R, 28, 174/29, 99 B; 317/3

[56] References Cited

UNITED STATES PATENTS

| | | | |
|---|---|---|---|
| 3,515,939 | 6/1970 | Trump | 174/14 R X |
| 3,740,925 | 6/1973 | Gothard | 174/16 B UX |
| 3,767,837 | 10/1973 | Graybill | 174/16 B X |
| 3,792,188 | 2/1974 | Cronin | 174/14 R X |
| 3,814,879 | 6/1974 | Cookson et al. | 174/14 R X |
| 3,856,978 | 12/1974 | Sletten et al. | 174/14 R |
| 3,864,507 | 2/1975 | Fox et al. | 174/14 R |
| 3,895,176 | 7/1975 | Cookson et al. | 174/16 B X |

FOREIGN PATENTS OR APPLICATIONS 2,422,961  10/1975  Germany .......................... 174/14 R

OTHER PUBLICATIONS

Diessner, A. et al., Free Conducting Particles in a Co-axial Compressed-Gas Insulated System, IEEE Trans, vol. PAS-89, No. 8, 12/70, pp. 1970-1978.

*Primary Examiner*—Arthur T. Grimley
*Attorney, Agent, or Firm*—Ostrolenk, Faber, Gerb & Soffen

[57] ABSTRACT

A contamination control device for use in a gas-insulated transmission bus consisting of a cylindrical center conductor coaxially mounted within a grounded cylindrical enclosure. The contamination control device is electrically connected to the interior surface of the grounded outer shell and positioned along an axial line at the lowest vertical position thereon. The contamination control device comprises an elongated metallic member having a generally curved cross-section in a first plane perpendicular to the axis of the bus and having an arcuate cross-section in a second plane lying along the axis of the bus. Each opposed end of the metallic member and its opposing sides are tapered to form a pair of generally converging and downward sloping surfaces to trap randomly moving conductive particles in the relatively field-free region between the metallic member and the interior surface of the grounded outer shell. The device may have projecting legs to enable the device to be spot welded to the interior of the grounded housing. The control device provides a high capture probability and prevents subsequent release of the charged particles after the capture thereof.

19 Claims, 9 Drawing Figures

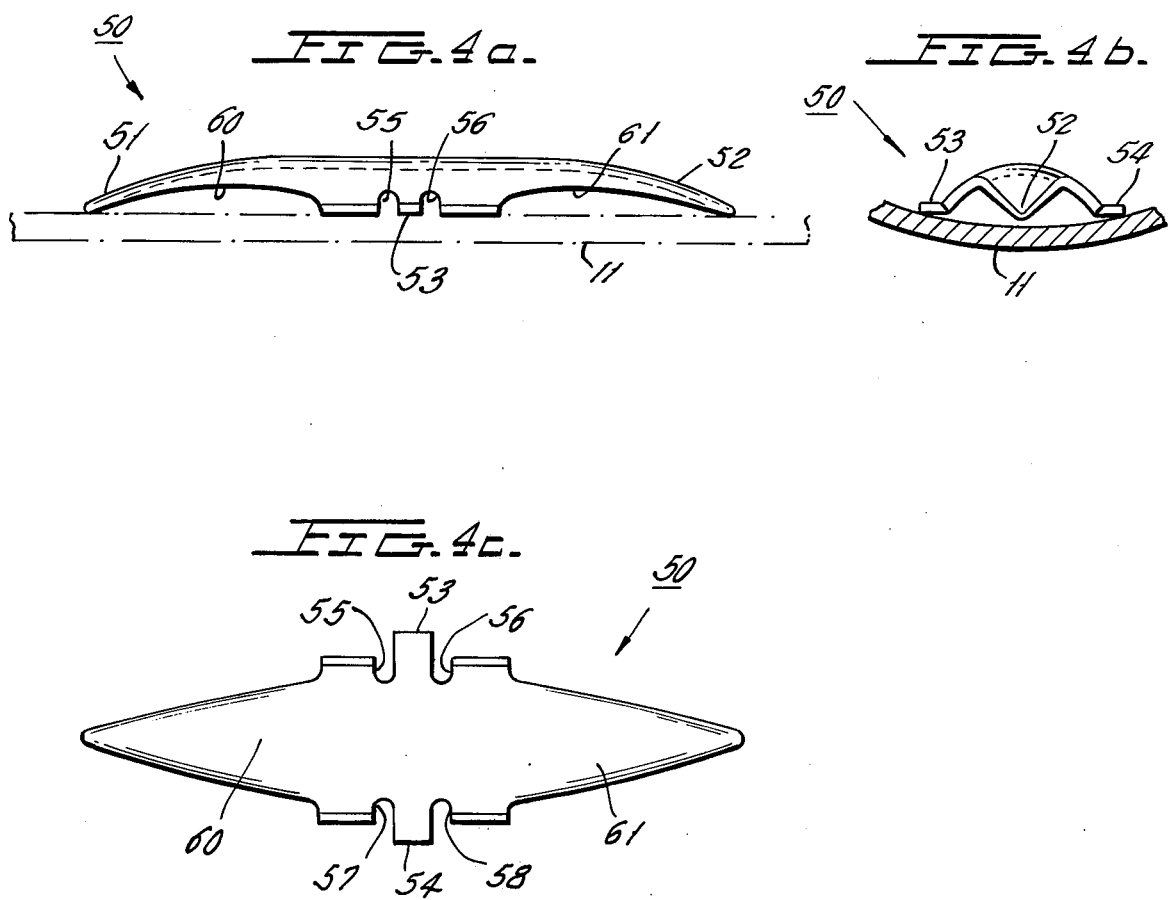

CONTAMINATION CONTROL DEVICE

BACKGROUND OF THE INVENTION

The present invention relates to means for precipitating charged particles from a gas and more particularly to a novel contamination control device for use in a coaxial gas-insulated electrical bus.

A gas-insulated transmission bus consists of a cylindrical center conductor coaxially mounted within a grounded cylindrical outer shell. The center conductor is conventionally supported by insulating spacers located at discrete intervals along the axis of the bus. The bus may conventionally be insulated with $SF_6$ gas at pressures ranging between zero psig and 50 psig. As the gas pressure is increased, the dielectric strength and the ultimate expected withstand voltage both increase.

A major limitation on gas-insulated systems occurs by contamination of the insulating space by conducting particles. The particles may be deposited upon interior surfaces during manufacture, by residue overlooked during cleaning of the bus elements or may be generated during assembly of the bus. The dielectric withstanding voltage of a gas-insulated system is greatly affected by particle contamination, such that even though the gas pressure is increased to improve the dielectric strength of the gas, the particles enclosed in the bus will prevent an overall improvement in dielectric properties. Consequently, there is a great need to at least control, if not completely eliminate, the presence of conducting impurities within the gas-insulated volume of the transmission bus.

A number of devices have been proposed to achieve this control of conducting particles. These devices generally provide an area of low electrical stress into which the conducting particles are moved by an electric field and in which area the charge particles cannot acquire sufficient energy to reenter the external, relatively higher electric field areas. Examples of such devices may be found in U.S. Pat. No. 3,515,939 to Trump, wherein a low field region is provided adjacent to the interior surface of a grounded outer shell and in communication with apertures allowing a charged particle to be radially moved into the low-field region; and U.S. Pat. No. 3,813,475 to Cronin, wherein an annular ring is coaxially arranged adjacent to the interior surface of the grounded outer shell to provide an annular volume into which axially moving particles may be received and retained.

In addition to requiring relatively massive components, the devices of both cited references are generally of low efficiency, as the charged particles exhibit a random motion and, even when finally positioned adjacent to the entrance openings of the known devices, tend to collect at the entrance to the low-field areas without full migration into such areas. A quantity of particles thus builds up at the entrance to the low field region and these particles frequently acquire enough energy to return to the high-field region adjacent to the center conductor and decrease the dielectric strength of the insulating gas.

BRIEF SUMMARY OF THE INVENTION

In accordance with the invention, a contamination control device, providing a higher efficiency of particle entrapment than hitherto possible, comprises a conductive member in electrical and mechanical attachment to the interior surface of a grounded outer shell of an electrical transmission bus having a center conductor. The conductive member has a curved cross-section in a first plane transverse to the axial direction of the terminal bus and an arcuate cross-section, of relatively less curvature per unit distance than the first cross-section, in a second plane lying parallel to the axis of the bus; each end of the conductive member has a generally converging taper to form a pair of opposed tapering ends having surfaces downwardly sloping toward the interior surface of the grounded outer shell.

As charged particles approach the conductive member, the charged particles are deflected to the tapering sloped sides and, while attempting to move along these sloped sides, their random motion tends to move the charged particles back toward the lowest point of the enclosed volume, aided by gravitational attraction. The charged particles are injected under the sides of the control device at relatively high velocity and are consequently trapped well within the low-field region to prevent particle buildup at the entrance areas of the control device. Thus, the particles are moved very efficiently into the region where capture probability is very high to reduce the possibility of particles acquiring enough energy to be expelled from the contamination control device.

The capture cross-section, being the entrance area presented to the particles as the particles move along the downwardly tapering sloped sides of the conductive member, is a function of the length of the device, which length may be easily increased to present an extremely large capture cross-section to the charged particles.

The device which can be relatively easily stamped and formed from stock aluminum sheet may also have extending welding legs to allow spot welding of the device to the housing interior.

Accordingly, it is a primary object of the present invention to provide a novel contamination control device for a gas-insulated electrical transmission bus, which device is capable of capturing charged particles therein with high efficiency.

It is another object of the present invention to provide a novel contamination control device virtually eliminating the possibility of a captured charged particle being subsequently released wherein the device can be easily and economically formed and secured to a bus housing interior.

It is still another object of the present invention to provide a novel contamination control device presenting a very large capture cross-section to the particles while minimizing the mass of the device.

It is a further object of the present invention to provide a novel contamination control device capable of causing charged particles to move a significant distance into its low-field volume, to prevent accumulation of the particles at the entrance to the low-field region and subsequent blockage thereof.

These and other objects of the present invention will become apparent to one skilled in the art upon a reading of the following detailed description and the drawings.

BRIEF DESCRIPTION OF THE DRAWINGS

FIGS. 4a, 4b and 4c are respective side, end and bottom plan views of a second embodiment of the novel contamination control device constructed in accordance with the invention.

DETAILED DESCRIPTION OF THE INVENTION

Figure 1:
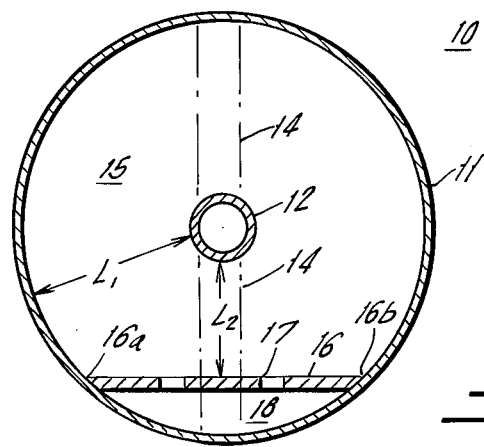
FIG. 1 is a radial cross-section of a coaxial electrical transmission bus utilizing a conventional particle entrapment device and useful in an understanding of the principles of the present invention.

Referring initially to FIG. 1, an electrical transmission bus 10 is conventionally comprised of a grounded conductive outer shell 11 coaxially mounted about a cylindrical center conductor 12. A plurality of insulating means 14, each having a length $L_1$ — the insulation separation distance between the exterior surface of center conductor 12 and the interior surface of outer shell 14 — are periodically arranged along the axial length of transmission bus 10 to support center conductor 12. The annular volume 15 between the exterior surface of center conductor 12 and the interior surface of outer shell 11 may be filled with an insulating gas, such as sulfur hexafluoride ($SF_6$) and the like, to increase the dielectric insulation properties and the withstand voltage of the bus.

This is the type of high voltage bus shown, for example, in U.S. Pat. No. 3,813,475 which is assigned to the assignee of the present invention, the disclosure of which is incorporated herein by reference.

Conductive particles may be deposited upon the interior surface of shell 11 or the exterior surface of center conductor 12 during manufacture and may not be removed during cleaning or be generated during assembly of the bus components. Experimental data has proven that the dielectric withstanding voltage of terminal bus 10 is adversely affected by particle contamination, such that even when the insulating gas pressure, typically maintained in a range between 0 psig and 50 psig, is increased to improve the dielectric strength of the insulating gas, the conductive particles enclosed in volume 15 tend to prevent an overall improvement in dielectric properties of the bus.

One known scheme for control of these particles is shown in FIG. 1, wherein a conductive plate 16 is positioned in a plane perpendicular to the vertical radius of transmission bus 10 and is electrically and mechanically connected, as by welding and the like, along its opposed axial edges 16a and 16b to grounded outer shell 11. A plurality of spaced apertures 17 are formed through plate 16. The volume 18 enclosed between plate 16 and outer shell 11 is substantially completely surrounded by a ground potential to have a minimal electric field therein. Contaminant particles are charged by the extremely high voltage (EHV), of the order of 235 kV., on center conductor 12 and acquire a charge of the same polarity to be radially repelled therefrom. Due to the chordal positioning of conductive sheet 16, the resulting equipotential electric surfaces tend to propel the charged particles toward plate 16, whereby the particles move toward apertures 17, having the steepest potential gradient adjacent thereto. Theoretically, the charged particles will pass through one of apertures 17, migrate into low-field region 18 and remain trapped therein. However, the charged particles tend to collect about the periphery of each aperture 17, to form a mass blocking the migration and collection of all remaining charged particles and increasing the probability that at least some of the remaining charged particles will be subsequently injected into insulating volume 15 to again disrupt the dielectric insulation thereof. The magnitude of particle entrapment may be increased by increasing the surface area of conductive plate 16 to increase the number of collecting apertures 17, but with the resulting decrease in the minimum insulation distance $L_2$ between the exterior surface of center conductor 12 and the closest point thereto on conductive plate 16. Thus, conventional contamination control devices require a trade-off to be made between surface area and corresponding particle capture cross-section and minimum insulation distance.

Figure 2A:
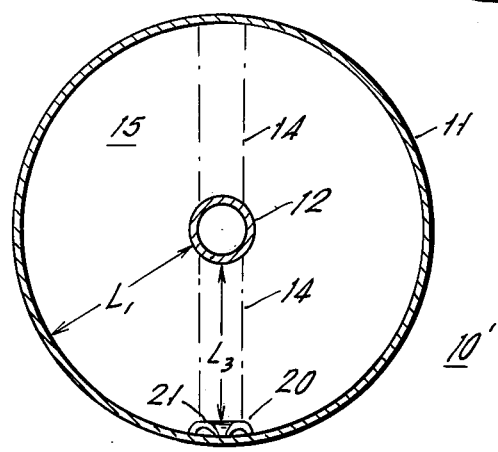
FIGS. 2a and 2b are respective radial and axial cross-sections of a portion of a coaxial transmission bus hav
Figure 2B:
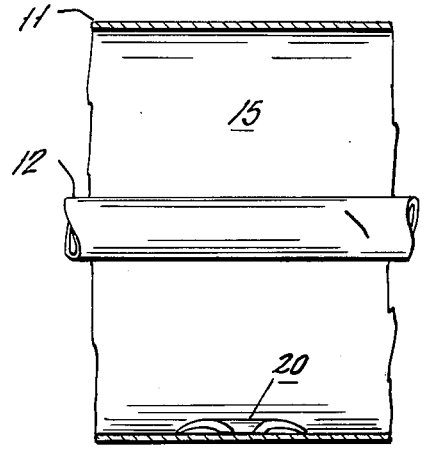

Referring now to FIGS. 2a and 2b, wherein like reference numerals are utilized for like elements, another electrical transmission bus 10' comprises center conductor 12 held in coaxial relationship with grounded outer shell 11 by a plurality of axially spaced insulating means 14. A novel contamination control device 20 formed of a conductive material, and having a shape to be more fully described hereinbelow, is electrically and mechanically connected to the interior surface of outer shell 11 and is positioned at the gravitationally lowest point on that surface. Device 20 is fabricated to have a minimal vertical dimension, whereby the effective insulation distance $L_3$, between a top surface 21 of device 20 and the exterior surface of center conductor 12, approaches the normal insulation distance $L_1$ between the interior surface of outer shell 11 and the exterior surface of center conductor 12. Illustratively, $L_1$ may be of the order of 8 inches and $L_3$ of the order of 7½ inches, to yield a ratio of $L_2$ to $L_1$ in excess of 0.9 and approaching 1.0 as a limit.

Figure 3A:
- FIGS. 3a, 3b and 3c are respective side, end and bottom plan views of a novel contamination control device in accordance with the principles of the invention.
Figure 3B:
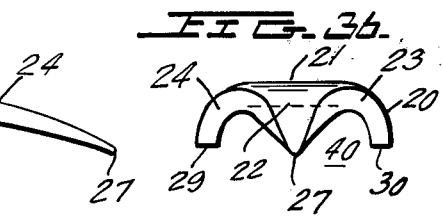

Referring now to all of FIGS. 2a, 2b and 3a, 3b and 3c, contamination control device 20 is formed of a length of conductive material, such as aluminum or the like, in a shape initially having a shallow curved cross-section in a plane transverse to its length. The curved shape is bounded by upper surface 21 and lower surface 22, as shown in FIG. 3b. The basic form is cut to a desired length and then formed with two pair of opposed surfaces 23–26 tapering towards opposed blunt end points 27 and 28. A pair of longitudinally extending and generally parallel leg formations 29 and 30 remain extended from opposed sides of bottom surface 22 in a direction opposite to top surface 21 after tapered surfaces 23–26 are cut into the blank.

The member bends smoothly in the longitudinal direction with a bending radius R such that opposed end points 27 and 28 are bent away from top surface 21.

Contamination control member 20 is placed within a section of outer shell 11 with its longitudinal dimension axially aligned therewith and leg formations 29 and 30 are electrically and mechanically connected to the interior surface of outer shell 11, as by welding or the like. The radius of curvature R is selected in accordance with the diameter of outer shell 11 to allow ends 27 and 28 to also electrically contact the interior surface of the outer shell when the member is fastened in place. A plurality of members 20 will be spaced along the length of housing 11.

In operation, the conductive member 20 is at the same zero-electrical-potential as the grounded outer shell 11 and forms a field-free region in a volume 40 defined by the opposed curvatures of interior surface 22 of member 20 and the interior surface of outer shell 11. Charged particles approaching member 20 are deflected around ends 27 and 28 and along sides 23–26 to attempt to move past member 20. The charged particles must now move along the slope of sides 23–26, disposed at an angle to the longitudinal axis of the transmission bus and the control member, and their random motion tends to move the charged particles with relatively high velocity under one of sides 23–26 of the device, whereby the charged particles are injected through the entrance area defined by each curved tapering side 23–26 and the oppositely curved interior surface of outer shell 11. The charged particles are subsequently moved a significant distance into the field-free region 40 before being trapped therein.

The use of tapered and downward sloping sides 23–26 is very important to the success of the device. A blunt straight shape, having very wide ends 27 and 28 transverse to the length of member 20, would tend to allow the particles to collect in the low-field area in front of the device at low stress and would allow the particles to be reactivated as the voltage is raised to large magnitudes, whereby the collected, but untrapped, particles acquire sufficient energy to cause re-injection of the charged particles into insulation volume 15. The tapered, downwardly-sloping surfaces 23–26 allow a very large capture cross-section to be presented to the particles as they attempt to move along the sides, which capture cross-section can be increased by increasing the total length of control member 20 between ends 27 and 28. While there is still some tendency for charged particles to collect in front of the tapered edges 23–26, this tendency is overcome with a relatively modest increase in voltage to allow the particles to move only a short distance in the direction transverse to the longitudinal direction of member 20, whereby continued motion causes even these particles to pass along one of tapered sides 23–26 of the member to be injected thereunder and captured. Therefore, there is a very high probability that the charged particles will migrate under one of sides 23–26 to be captured within field-free region 40 to prevent accumulation of the particles at the entrances into the field-free region. Thus, the particles are moved with great efficiency into the region where capture probability is highest to virtually eliminate the possibility that any of the charged particles will acquire enough energy to be re-injected into insulating volume 15.

In an electrical transmission bus 10' having a grounded outer shell 11 of 16 inch diameter, the use of a member 20, having a length of approximately 8 inches between ends 27 and 28, causes virtually all charged particles to be intercepted and collected within the field-free region 40 before the charged particles can reach one of insulators 14 and be collected thereon. The charged particles do not return to the high-stress volume outside field-free region 40, even at full test voltages when transmission bus 10' is energized to an EHV, between center conductor 12 and outer shell 11, of up to at least 325kV. Placement of a multiplicity of members 20 along the length of each section of axial extended bus 10' will enhance entrapment of charged particles, as the particles have less distance to travel before encountering one of the contamination control devices.

Figure 3C:
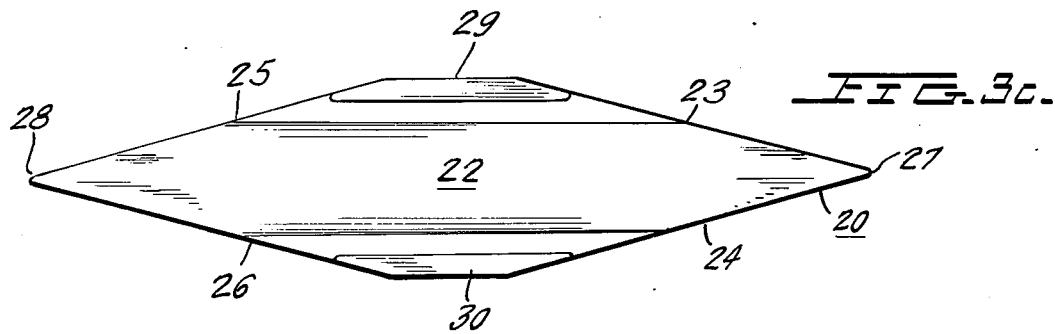

FIGS. 4a, 4b and 4c show a second embodiment of a contamination control member which is generally similar to the member of FIGS. 3a, 3b and 3c. In FIGS. 4a, 4b and 4c, the member 50 has longitudinally extending, downwardly tapered sections 51 and 52 and further has laterally extending welding projections 53 and 54 which are outwardly bendable by virtue of isolation slots 55–56 and 57–58, respectively. The welding projections 53 and 54 permit easy spot welding of the contamination control device 50 to the bottom of the interior of grounded conductive housing 11 as shown in FIG. 4b.

Note that the general outline of the geometry shown in FIGS. 3a, 3b and 3c is kept wherein the contamination control device contains upwardly contoured arcuate sections, such as sections 60 and 61 in FIG. 4a, which will allow wide entrance openings to contamination particles from the interior of bus housing 11 into the general field-free region within contamination control device 50 bounded by housing 11.

Although the present invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

What is claimed is:

1. A contamination control device for trapping charged particles in an electrical transmission bus including an elongated center conductor coaxially mounted within a cylindrical conductive shell, said device comprising: an elongated conductive member electrically connected to said shell to maintain said member at a value of electrical potential essentially equal to an electrical potential on said shell, thereby to form a region having a low electrical field intensity within a volume bounded by said member and said shell; said member having a pair of longitudinally opposed ends; a pair of generally tapering side portions being formed at at least one of said pair of ends and generally converging toward the associated end, each of said tapering side portions forming an entranceway arranged at an angle to the axis of said center conductor to facilitate entry of said charge particles through one of said entranceways and into a portion of said region removed from said entranceways whereby said particles are trapped within said region.

2. A device as set forth in claim 1, wherein said member has a generally curved cross-section in a first plane substantially perpendicular to the axis of said outer conductor; said region being partially defined by the opposed curvatures of said first cross-section of said member and the interior surface of said shell.

3. A device as set forth in claim 2, wherein said member further has an arcuate cross-section in a second plane generally passing through and lying along said axis; said side portions having a taper generally directed away from a top surface of said member farthest from said interior surface of said shell in addition to said converging taper.

4. A device as set forth in claim 3, wherein the radius of curvature of said second cross-section is greater than the radius of curvature of said first cross-section.

5. A device as set forth in claim 3, wherein said member has a pair of side portions formed at each opposed end thereof and converging toward the associated end.

6. A device as set forth in claim 5, wherein each pair of longitudinally adjacent side portions define a leg formation therebetween for fastening said member to said shell.

7. A device as set forth in claim 5, wherein each opposed end is substantially in contact with said interior surface of said shell.

8. A device as set forth in claim 1, wherein said conductive material is aluminum.

9. A device as set forth in claim 1, wherein a maximum length dimension of said member in said second plane is greater than a maximum width dimension of said member in said second plane.

10. A device as set forth in claim 1, wherein said member is mounted to the interior surface of said shell along a gravitationally lowest contour thereof.

11. A device as set forth in claim 1, wherein a ratio of the inner diameter of said shell to the length of said member is equal to about 2:1.

12. A device as set forth in claim 1, wherein an exterior surface of said center conductor is at a first distance from the interior surface of said shell; said top surface of said member is at a second distance from said exterior surface of said center conductor; and a ratio of said second distance to said first distance is greater than 0.9.

13. A transmission bus comprising:
an elongated center conductor;
an elongated conductive outer shell surrounding and concentric with said center conductor;
at least one contamination control device electrically connected to and positioned upon an interior surface of said outer shell;
each said contamination control device comprising a conductive member having a generally curved cross-section in a first plane substantially transverse to the axis of said center conductor, said cross-section being curved in a direction opposite to the direction of curvature of said outer shell;
said member electrically coupled to said interior surface at opposite ends of a maximum width dimension of said member in said first plane;
said conductive member and said conductive outer shell defining the boundaries of a region having a relatively low electrical field intensity therein;
said conductive member having opposed first and second ends, at least one of said first and second opposed ends including at least one opening into said low field region, each said opening arranged at an angle less than 90° relative to the axis of said center conductor to permit entry of a charged particle therethrough and into said region.

14. A transmission bus as set forth in claim 13, wherein each end of said conductive member has a pair of tapering sides, each side arranged at an angle to said center conductor axis to form a pair of complementary disposed openings at each of said first and second member ends.

15. A transmission bus as set forth in claim 13, wherein said conductive member has a smoothly curved cross-section in a second plane axially extending through said bus and said member, the radius of curvature in said second plane being adapted to position each of said opposed first and second ends adjacent to the interior surface of said outer shell.

16. A transmission bus as set forth in claim 15, wherein said conductive member has a pair of downward sloping tapered sides at each of said first and second ends thereof, each said pair of sides converging toward the associated end and toward the interior surface of said outer shell.

17. An electrical transmission system as set forth in claim 16, wherein opposed portions of said conductive member substantially midway between said ends are electrically connected to said outer shell.

18. The contamination control device as set forth in claim 1, which further includes at least first and second welding projections extending from edge regions of said conductive shell.

19. The device of claim 18 wherein said first and second welding projections extend laterally from central regions of the edges of said side portions of said conductive shell.

* * * * *